United States Patent [19]

Kussy et al.

[11] 4,149,216

[45] Apr. 10, 1979

[54] FUSED UNITIZED COMBINATION STARTER

[75] Inventors: Frank W. Kussy, Randallstown; John L. Haydu, Towson, both of Md.

[73] Assignee: Gould Inc., Rolling Meadows, Ill.

[21] Appl. No.: 797,500

[22] Filed: May 16, 1977

[51] Int. Cl.[2] .................... H02B 1/04

[52] U.S. Cl. .................... 361/357; 335/6; 337/6

[58] Field of Search .................... 361/357, 334, 347, 349; 337/6; 335/6

[56] References Cited

U.S. PATENT DOCUMENTS 3,354,356 11/1967 Pettit et al. .................... 361/357

*Primary Examiner*—Harold Broome
*Attorney, Agent, or Firm*—Ostrolenk Faber Gerb & Soffen

[57] ABSTRACT

A multipole unitized motor starter is constructed of a common base having mounted thereon a disconnect switch, an electromagnetic contactor and a fuse unit connected in electrical series between the switch and contactor. The fuse unit is a plug-in device which is readily removable for service access and when operatively mounted is positioned to permit direct viewing of the switch contacts.

10 Claims, 22 Drawing Figures

43
44
44a
44b
45
45a
46
46a
46b
47
48
81
81a
81b
82
83
9
11
13
14

85
84
86
87
88
89
91
92
96
97
15A
15B
16
17

FUSED UNITIZED COMBINATION STARTER

This invention relates to electrical switching apparatus in general, and more particularly, relates to a fused unitized combination motor starter.

Pending U.S. application Ser. No. 681,243, filed Apr. 28, 1976 by F. W. Kussy et al. for a UNITIZED COMBINATION STARTER, discloses a compact unitized switching means, including a multipole electromagnetic contactor in series with a multipole circuit breaker having fault current responsive trip means.

Pursuant to the instant invention, a unitized combination starter includes the series-connection of a multipole electromagnetic contactor, a multipole disconnect switch and a multipole fuse unit all mounted on a molded insulating base. The fuse unit is a plug-in device, which may be conveniently removed to gain access to the contact structure of the contactor. However, when the fuse unit is operatively mounted, it is positioned so that there may be direct viewing of the switch contacts.

Each pole of the disconnect switch is provided with a movable contact arm that is mounted at one of its ends to a stationary pivot. The arm extends through a transverse aperture in an insulating tie-bar, which in turn is connected to a contact operating mechanism. The tie-bar encircles each contact arm to provide the only connection between the contact arms and their operating mechanisms.

Accordingly, a primary object of the instant invention is to provide a novel construction for a combination motor starter.

Another object is to provide a motor starter of this type in which a multipole electromagnetic contactor, a multipole disconnect switch, and a multipole fuse unit are arranged as a compact unitized structure.

Still another object, is to provide a combination unit of this type having a removable plug-in fuse unit.

A further object is to provide a combination unit of this type having novel means for connecting the movable contacts to the contact operating mechanism.

These objects as well as other objects of this invention shall become readily apparent after reading the following description of the accompanying drawings in which.

Figures 15, 15A, 15B, 16, 17, 18:
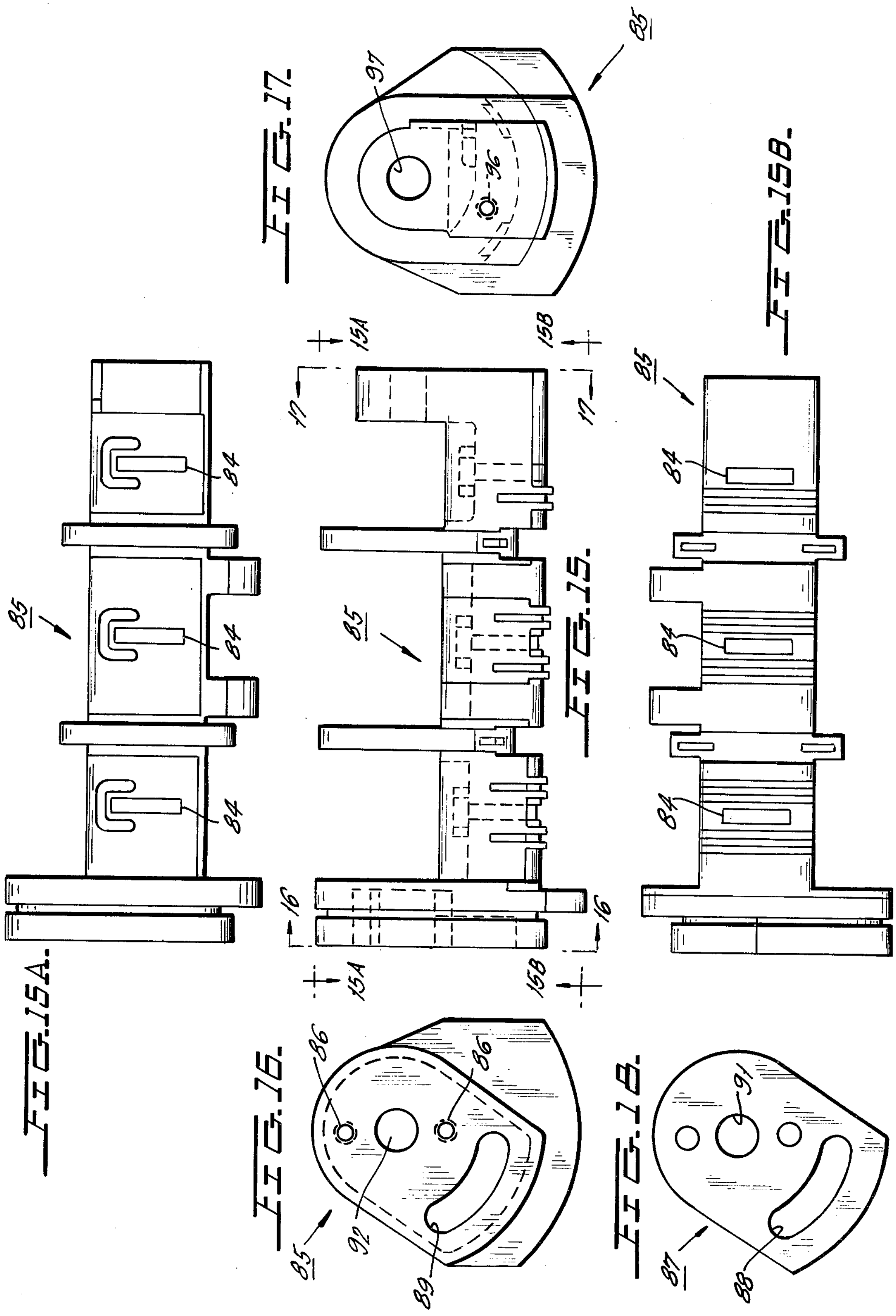
FIG. 15 is a front elevation of the movable contact actuator or tie-bar.
FIGS. 15A and 15B are elevations of the contact actuator of FIG. 15 looking in the directions of their respective arrows 15A—15A and 15B—15B of FIG. 5.

FIGS. 16 and 17 are end views of the contact actuator of FIG. 15 looking in the directions of the respective arrows 16—16 and 17—17 of FIG. 15.

FIG. 18 is an elevation of the metal plate mounted to one end of the contact actuator of FIG. 15.

Figure 1:
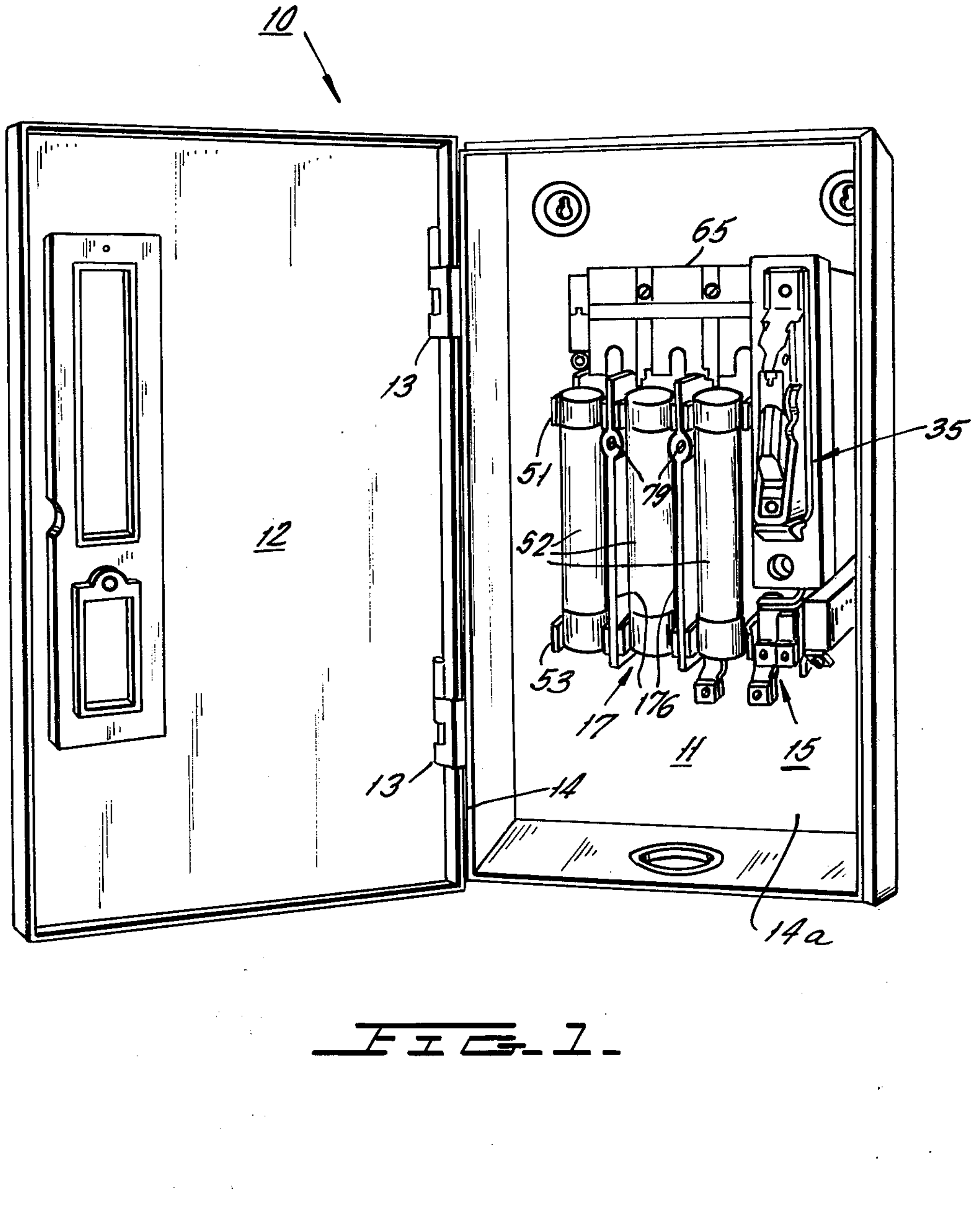
FIG. 1 is a perspective showing the unitized fused switching unit of the instant invention mounted within an enclosure.
Figure 2:
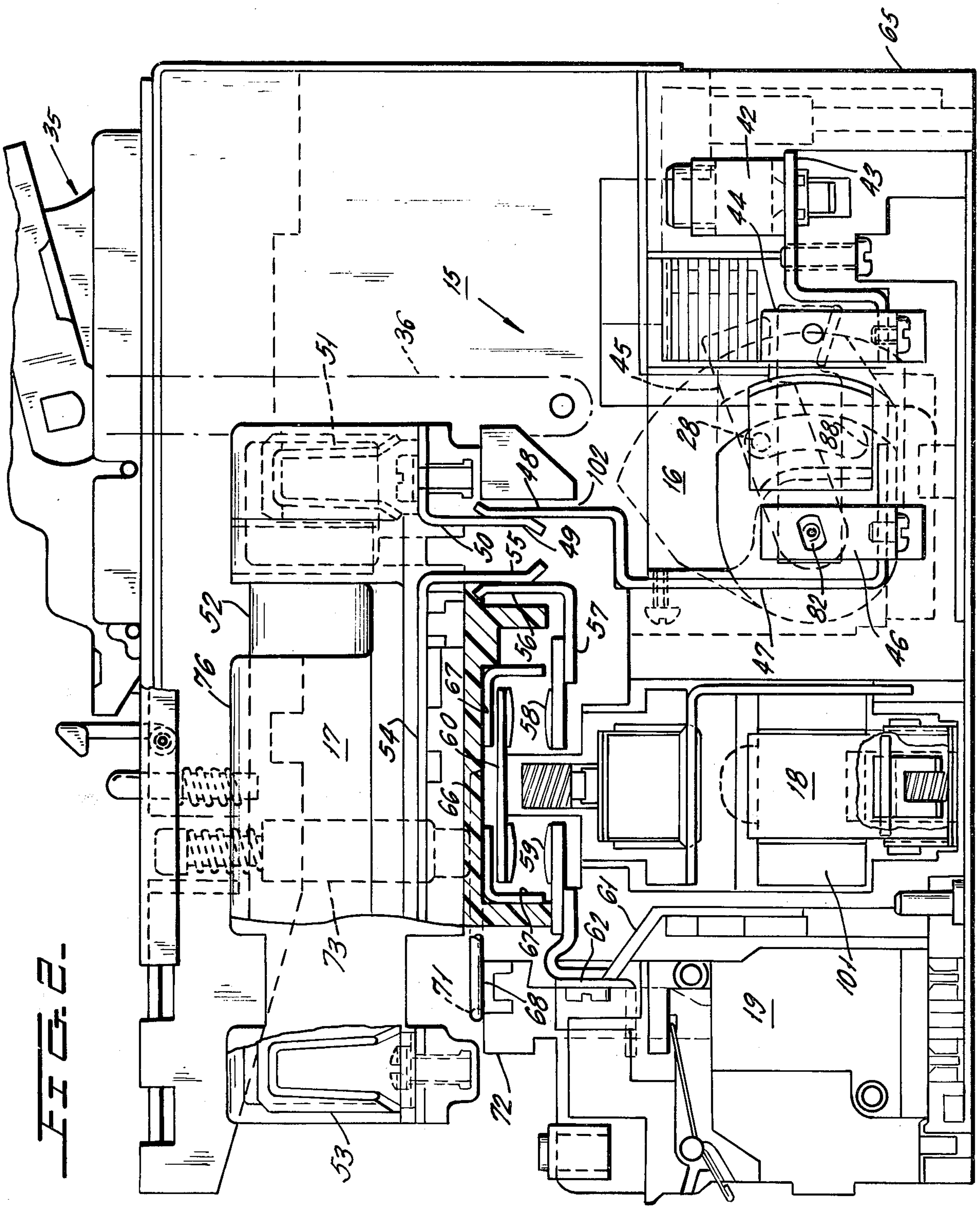
FIG. 2 is a longitudinal section through one pole of the switching unit of FIG. 1.

Now referring to the Figures. Enclosed electric switching apparatus 10 (FIG. 1) includes generally rectangular enclosure 11 having an open front and provided with front cover 12 mounted on hinges 13 along cover edge 14. Disposed within enclosure 11 and secured to rear wall 14*a* thereof is unitized combination motor starter 15, including the series combination of disconnect switch 16, fuse unit 17, and electromagnetic contactor 18. The end of contactor 18 remote from switch 16 is connected in series with an array of three overloaded relays 19 (FIG. 2).

Combination unit 15 is a three pole device having substantially identical current paths through each pole. With reference to FIG. 2 it is seen that the current path through each pole is from wire grip 42 on line terminal strap 43 to stationary switch contact 44, through movable contact arm 45 to contact clip 46 at the end of contact arm 45 remote from stationary contact 44, through strap 47 having plug-in contact 48 at its free end in engagement with plug-in contact 49 at one end of strap 50 whose other end is connected to fuse clip 51, through fuse 52 to fuse clip 53 mounted at one end of strap 54 whose other end is provided with plug-in contact 55 in engagement with plug-in contact 56 at one end of strap 57, to stationary contactor contact 58, through bridging contact 60 and the other stationary contactor contact 59 to load terminal strap 61. The latter is connected to terminal 62 of overload relay 19.

Disconnect switch 16 and electromagnetic contactor 18 are positioned in end-to-end relationship, and elements thereof are operatively positioned within cavities of common molded insulating base 65. Contactor 18 is provided with removable insulating front cover 66 having internal cavities at the rear thereof wherein contact means 58, 59, 60, together with arc extinguishing magnetic members 67 are disposed. U-shaped bail 68 is provided with inwardly turned ends 69, 69 which extend into complementary aligned apertures in opposite sides of cover 66 to pivotally mount bail 68 to cover 66. As seen in FIG. 2, when cover 66 is in its operative position, the web 71 of bail 68 rests against the forward edges of reset plungers 72 for all three poles of overload relay 19. Reset rod 73 of handle mechanism 35 is positioned so that upon actuation thereof, its rear end engages bail arm 74 to pivot bail 68 counterclockwise with respect to FIG. 2 so that web 71 depresses all three overload relay reset plungers 72, thereby resetting overload relay 19.

Figure 4:
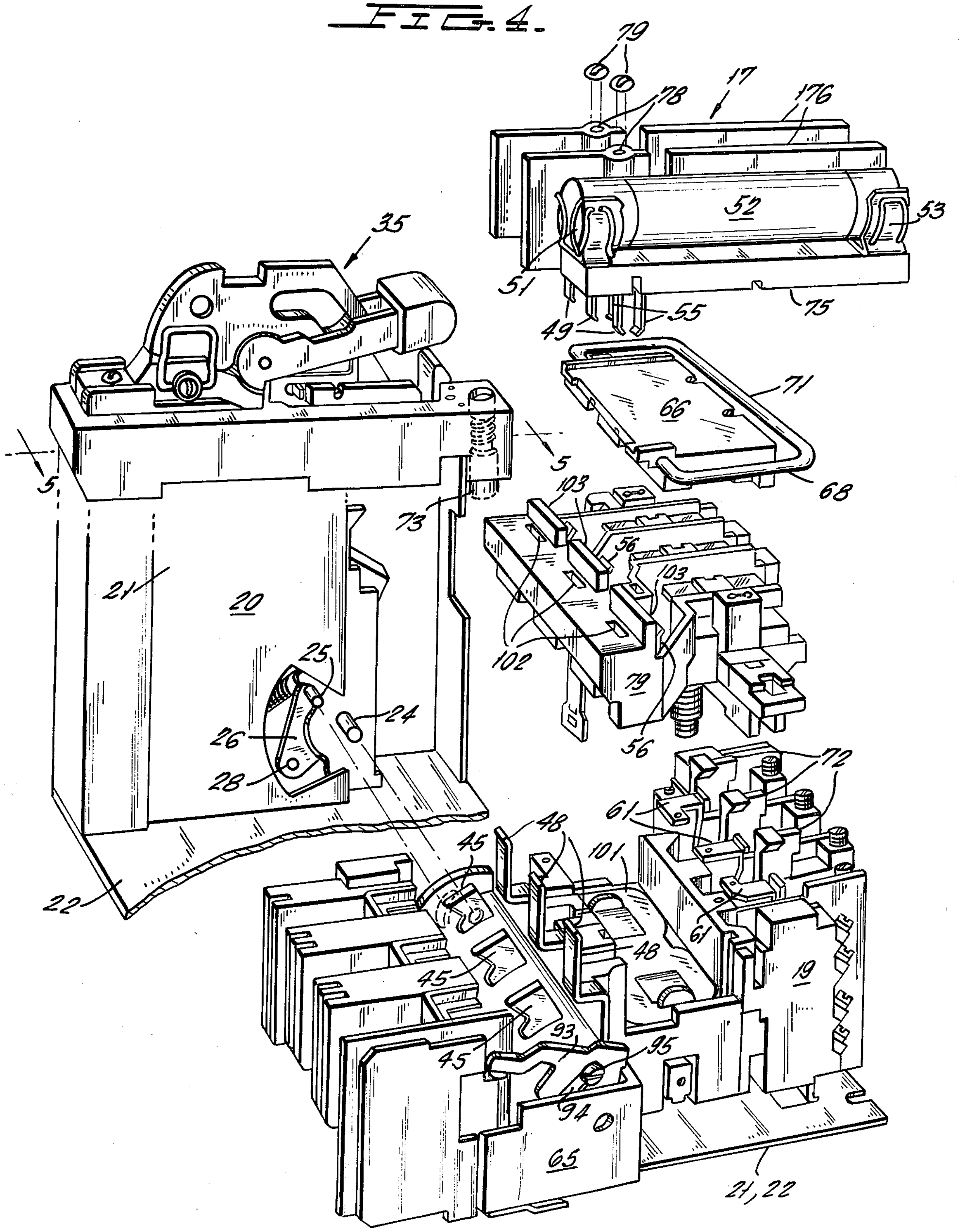
FIG. 4 is an exploded perspective of the main elements of the switch unit.
Figure 6:
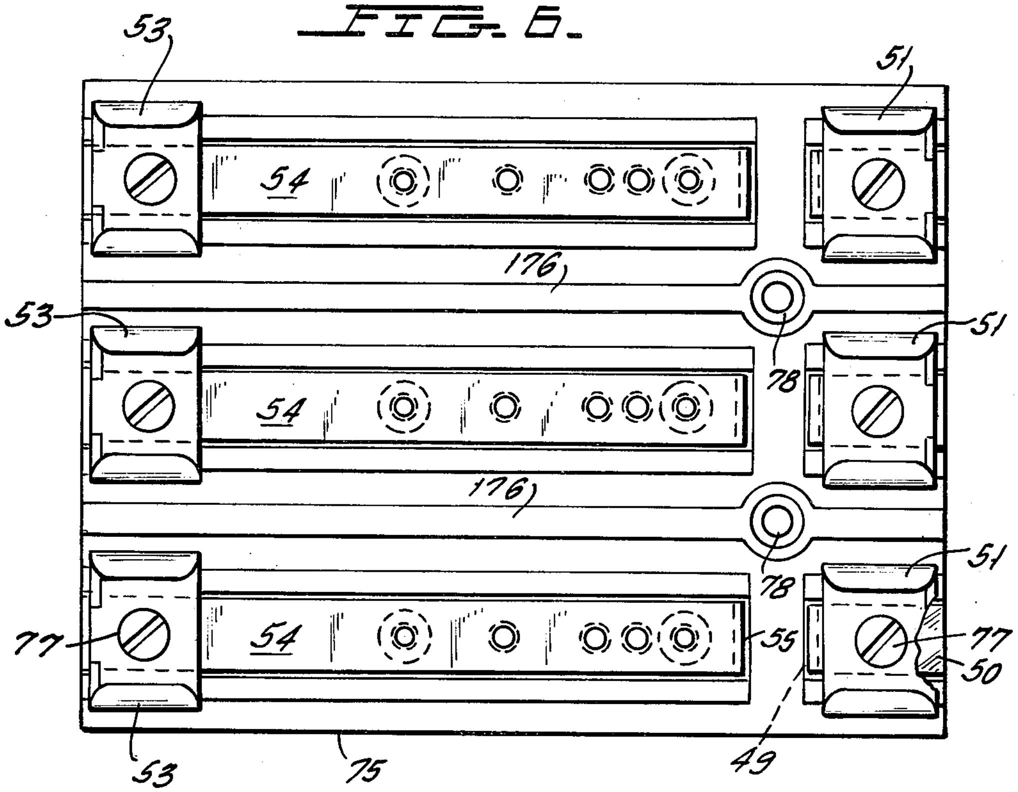
FIG. 6 is a front elevation of the removable fuse carrier.

Fuse unit 17 includes three fuses 52 mounted side by side to the front of molded insulating carrier 75 having longitudinally extending partitions 176 disposed between fuses 52 (FIG. 4). Spring clips 51, 53 for holding the ferrules at opposite ends of fuses 52 are disposed on the front surface of carrier 75. Screw 76, 77 secure clips 53, 51, respectively, and straps 54, 50, respectively, to carrier 75 (FIG. 6). The latter is also provided with elongated aperture through which the plug-in contact formations 49, 55 of the respective straps 50, 54 extend to the rear of carrier 75. Apertures 78 through partitions 76 provide clearances for two screws 79 (FIG. 4) which are received by threaded apertures (not shown) in stationary contact carrier 79 for removably securing fuse unit 17 in its operative position of FIG. 2. In this position fuse unit plug-in contacts 49, 55 are in operative engagement with the respective plug-in contacts 48, 56 of switch 16 and contactor 18, respectively. Carrier 79 also provides clearance apertures 102 through which plug-in contact blades 48 extend. Forward protrusions 103 of carrier 79 provide clearances between the pairs of contacts 48, 56 when fuse unit 17 is dismounted.

Figures 8, 9, 10, 11, 12, 13, 14:
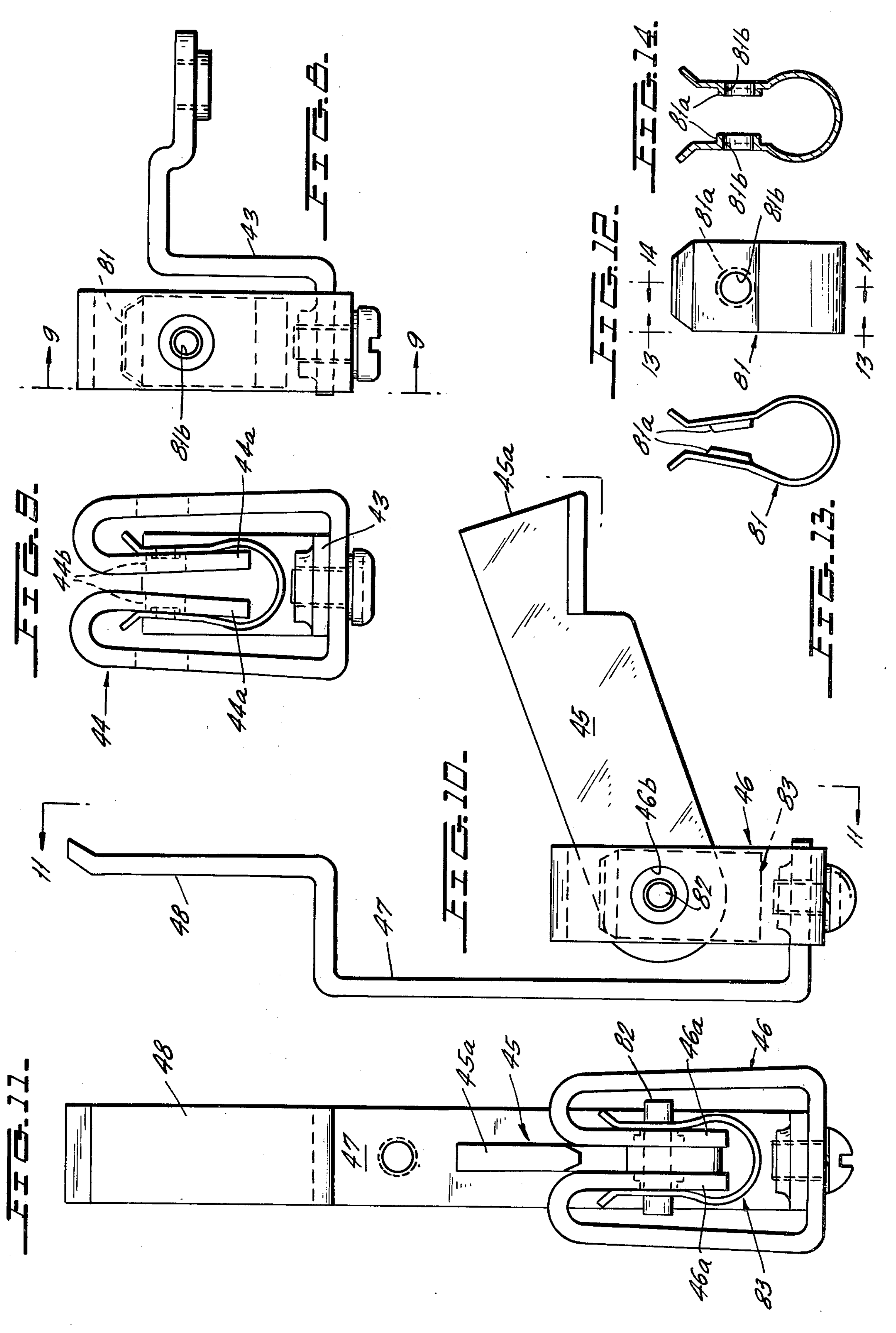
FIG. 8 is a side elevation of one of the stationary contact assemblies.
FIG. 9 is an end view of the contact assembly of FIG. 8 looking in the direction of arrows 9—9 of FIG. 8.
FIG. 10 is a side elevation of a movable contact subassembly.
FIG. 11 is an end view of the subassembly of FIG. 10 looking in the direction of arrows 11—11 of FIG. 10.
FIG. 12 is a side elevation of a contact pressure spring.
FIG. 13 is an end view of the pressure spring of FIG. 12 looking in the direction of arrows 13—13 of FIG. 12.
FIG. 14 is a cross-section of the spring of FIG. 12 looking in the direction of arrows 14—14 of FIG. 12, with the arms of the spring being spread so they are nearly parallel.

The movable and stationary contact structures for each pole of disconnect switch 16 are very similar to the switch constructions shown in U.S. Pat. No. 3,684,849, issued Aug. 16, 1972 to M. V. Zubaty for a Heavy Duty Switch. More particularly, stationary contact clip 44 (FIG. 9) is a U-shaped member constructed of conducting spring material. The free ends of the U-arms 44*a* are reversely and inwardly bent, and are provided with apertures 44*b* which receive lips 81*a* protruding inwardly from the arms of U-shaped pressure spring 81 and surround clearance apertures 81*b* thereof (FIG. 12). Contact arm sections 44*a* are disposed between the arms of pressure spring 81 so that arm sections 44*b* are biased toward one another to firmly engage opposite sides of movable contact arm 45 at end 45*a* thereof (FIG. 10) when disconnect switch 16 is closed. The other end of contact arm 45 is provided with an aperture wherein hollow spring pin 82 is snuggly fitted (FIG. 11).

Contact clip 46 is of the same construction as stationary contact clip 44, and pressure spring 83 for contact clip 46 is of the same construction as pressure spring 81. The ends of pin 82 extend through the aligned apertures in pressure spring 83 to pivotally mount movable contact arm 45 to contact clip 46, with the inwardly turned arms 46*a* of the latter firmly engaging opposite sides of contact arm 45. The outer sections of the arms for contact clip 46 are provided with apertures 46*b* which are aligned with the apertures in pressure spring 83 to permit insertion of pivot pin 82 after contact arm 45 is entered between clip arm sections 46*a*.

Figure 3:
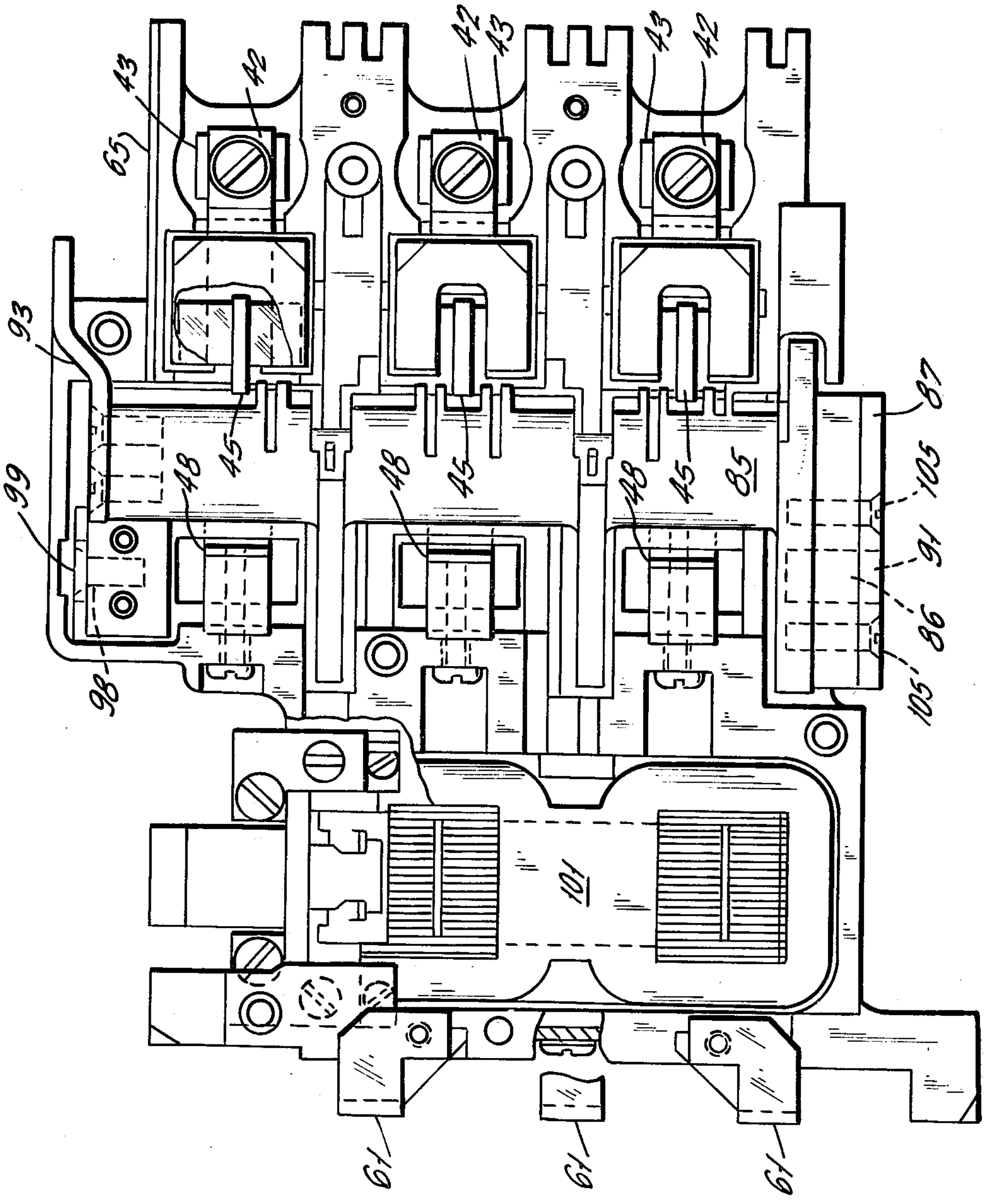
FIG. 3 is a front elevation of the switching unit of FIG. 1 with the operating mechanism, fuse assembly, contactor contact structure, and the contactor armature removed.

Each of the contact arms 45 projects through an individual transverse aperture 84, of elongated rectangular cross-section, extending through insulating tie bar 85 (FIG. 15). The end of rod 85 shown in FIG. 16 is adjacent to overcenter toggle contact operating mechanism 20 and is provided with threaded apertures 86 which receive screws 105 (FIG. 3) securing metal plate 87 (FIG. 18) to the end of tie bar 85 shown in FIG. 16. Plate 87 is provided with arcuate slot 88 that is aligned with arcuate depression 89 in tie rod 85, and plate 87 is also provided with circular bearing aperture 91 that is aligned with circular depression 92 in tie bar 85. For a reason which will hereinafter be seen, pins 25, 28 of contact operating mechanism 20 extend through apertures 91, 88, respectively, of plate 87.

Auxiliary switch actuator member 93 (FIG. 4) is provided with arcuate slot 94 through which the threaded portion of screw 95 extends into tapped hole 96 in the end of tie bar 85 shown in FIG. 16. This end also includes bearing recess 97 coaxial with bearing recess 92. Recess 97 is aligned with a similar bearing recess (not shown) in actuator 93 and these recesses receive bearing pin 98 (FIG. 3) protruding from bracket 99 secured to base 65. Thus, pins 25 and 98 constitute bearings for tie bar 85. As will hereinafter become evident, screw 95 is tightened only enough to mount actuator 93 to permit relative movement of actuator 93 with respect to tie bar 85, about bearing pin 98 as a center. This assures that actuator 93 will not operate its associated axuiliary switches (not shown) until contacts 44, 45 are fully engaged.

Manually operable spring power overcenter toggle contact operating mechanism 20 (FIG. 5) of disconnect switch 16 includes frame 21 extending forward from rear wall 14*a* of housing 11 and being secured thereto by fasteners (not shown) extending through frame leg 22. Mechanism 20 also includes actuator 23 mounted to frame 21 on stationary pivot 24 and having arcuate slot 126 which provides clearance for fixed pin 25. The latter is a pivot 25 for both tie-bar 85 and triangular toggle member 26. The other toggle member 27 is elongated and is pivotally connected at pin 28 to member 26. The end of member 27 remote from knee 28 extends through a guide aperture in bracket 29 which is pivoted to frame 21. Bracket 29 also provides a bearing surface for one end of coiled compression spring 31 whose other end bears against shoulder 32 of member 27 so as to bias knee 28 away from bracket 29. Elongated notch 33 at the rear of actuator 23 and pin 34 protruding from the side of member 26 into notch 33 combine to form a lost motion connection between toggle member 26 and actuator 23. Link 36 extends rearward from handle mechanism 35 and is connected to actuator 23 at pivot 37.

Figures 5, 5A, 5B:
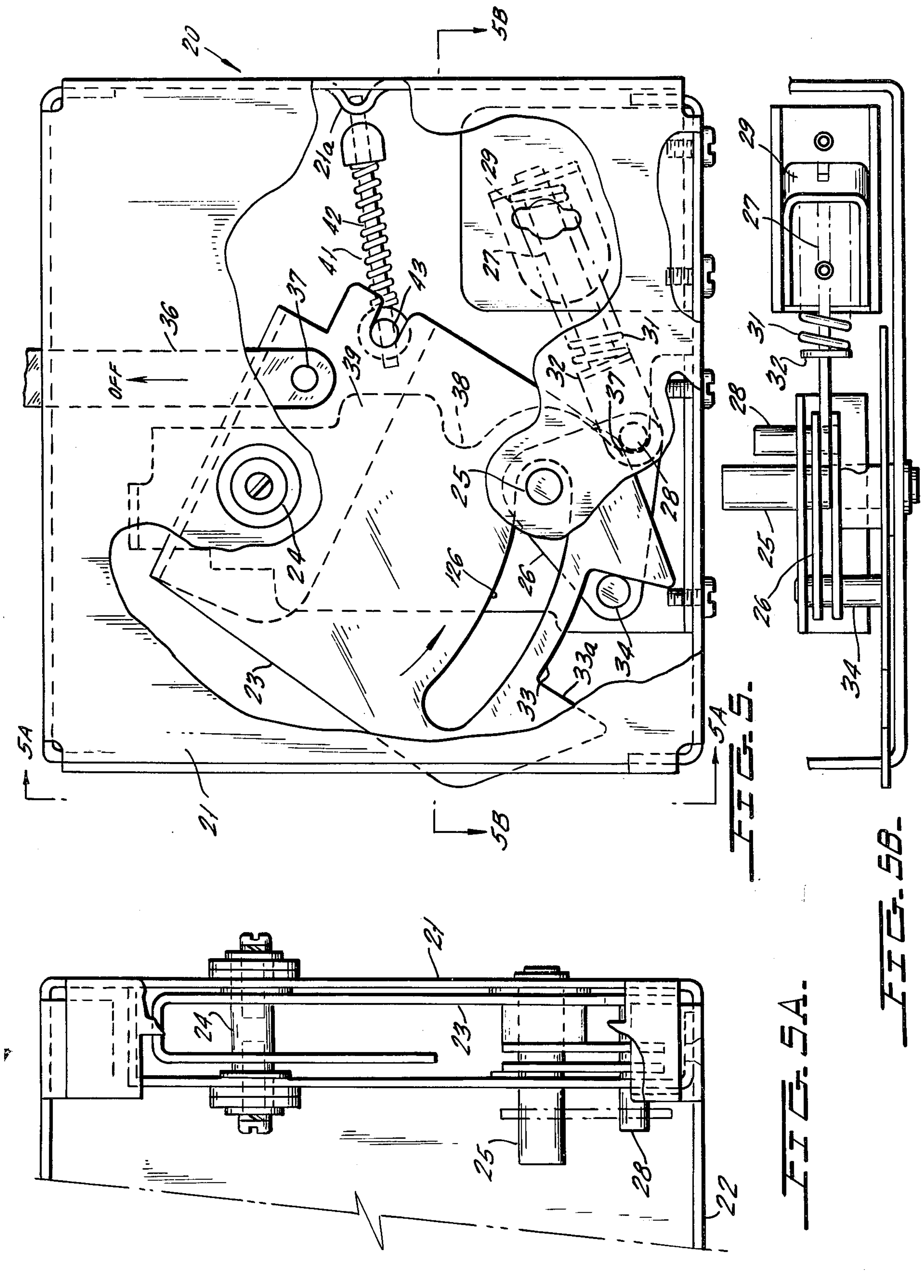
FIG. 5 is an elevation of the contact operating mechanism looking in the direction of arrows 5—5 of FIG. 4.
FIG. 5A is an end view of the operating mechanism looking in the direction of arrows 5A—5A of FIG. 5.
FIG. 5B is a cross-section taken through lines 5B—5B of FIG. 5 looking in the direction of arrows 5B—5B.
Figure 7:
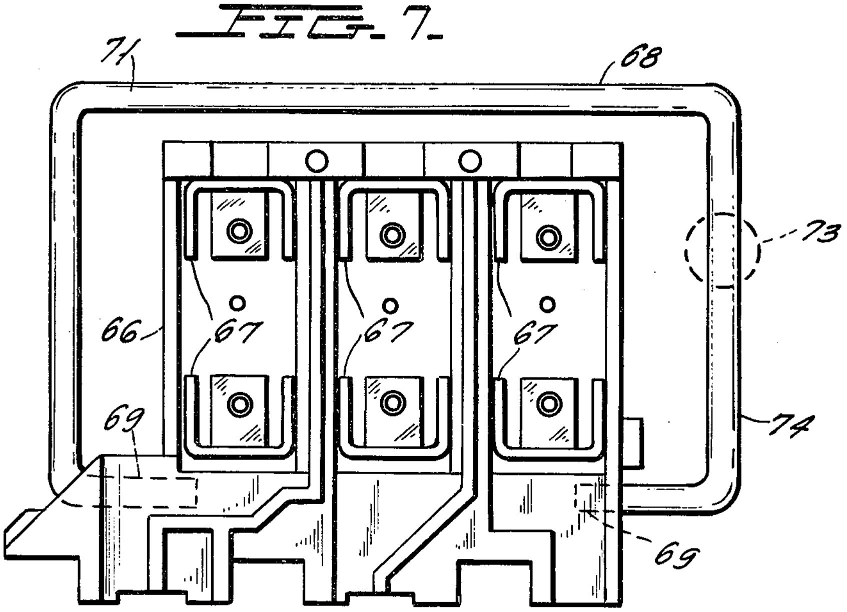
FIG. 7 is a rear elevation of the cover for the contacts of the electromagnetic contactor section.

As will hereinafter be seen, with operating mechanism 20 in the position of FIG. 5, the contacts 44, 45 of switch 16 are closed. The latter are opened by moving pin 28 forward or upward with respect to FIG. 5. This is accomplished by moving link 36 upward to pivot actuator 23 counterclockwise. Actuator 23, in pivoting counterclockwise, moves free of toggle 26, 27 until the left edge 33*a* of notch 33 engage with pin 34. Continued counterclockwise movement of actuator 23 causes counterclockwise movement of toggle member 26 about its fixed pivot 25, thereby moving toggle knee 28 forward. At the point where knee 28 moves forward of a straight line between the fixed pivots 25, 29 for toggle members 26, 27, the force exerted by spring 31 drives pin 28 forward with a snap action until pin 28 reaches forward notch 38 in frame wall 39. The rear or contact closed position for pin 28 is established by notch 37 in frame wall 39. Rearward operation of link 36 to move actuator 23 clockwise moves the toggle knee 28 rearward for closing of switch 16. Coil compression spring 41 wound around rod 42 extending between fixed frame formation 21*a* and pin 43 on actuator 23, biases actuator 23 clockwise when positioned as in FIG. 5 and biases actuator 23 counterclockwise when pin 43 is moved forward of a line extending between pivots 21*a* and 24. Thus, it is seen that fused unitized combination starter 11 is of extremely compact construction, yet it is extremely simple to gain access to internal elements thereof for servicing. More particularly, the mounting of fuse unit 17 in front of contactor 18 substantially reduces the height of the required enclosure without appreciably increasing its depth requirement. The contactor contacts 58–60 are readily accessible merely by removing fuse unit 17 and cover 66. In order to replace contactor coil 101, it is merely necessary to remove fuse unit 17, cover 66 and contact structure 79 of contactor 18. As seen in FIG. 2, with fuse unit 17 mounted in its operative position, when enclosure cover 12 is open, there is nothing to obscure visual observation of the free ends of movable contacts 45.

Although this invention has been described with respect to its preferred embodiments, it should be understood that many variations and modifications will now be obvious to those skilled in the art, and it is preferred, therefore, that the scope of this invention be limited, not by the specific disclosure herein, but only by the appended claims.

What is claimed is:

1. An electrical protective device mountable to a surface positioned to the rear of said device; said device including a molded insulating base at the rear thereof; a multipole electromagnetic contactor on said base having opposed first and second ends; terminals at said first end for connecting said device in an external circuit; a multipole switch on said base having opposed third and fourth ends; additional terminals at said third end for connecting said device in an external circuit; said contactor and said switch being positioned with said second end adjacent said fourth end; a multipole fuse unit removably supported on said base and positioned in front of and confronting said contactor; said fuse unit being connected in electrical series with said switch and said contactor.

2. An electrical protective device as set forth in claim 1 in which the fuse unit is positioned in front and confronting only a portion of said switch, said switch including a movable contact for each pole thereof, said movable contacts being viewable from the front of the device when the switch is open.

3. An electrical protective device as set forth in claim 1 in which the contactor and the switch are provided with respective first and second sets of plug-in contacts operatively engaged with respective third and fourth sets of plug-in contacts of said fuse unit.

4. An electrical protective device as set forth in claim 3 in which the first and second sets of plug-in contacts are disposed at the other ends of the contactor and the switch.

5. An electrical protective device as set forth in claim 1 also including an individual resettable overload relay means for each of at least two poles of said contactor connected to and in series circuit with the terminals at said first end of said contactor.

6. An electrical protective device as set forth in claim 5 also including a common reset member operatively mounted to the contactor for simultaneously resetting all of said overload relay means.

7. An electrical protective device as set forth in claim 6 in which the contactor includes a contact structure and a removable cover for said contact structure, said reset member being mounted to said cover and operatively positioned for a resetting operation when actuated by a control disposed in front of the device.

8. An electrical protective device as set forth in claim 1 in which each pole of the switch includes a stationary contact and a movable contact arm pivoted at one of its ends and having its other end engageable with said stationary contact, a contact operating mechanism and an insulating tie bar connecting said mechanism to all of said movable contact arms for selectively operating the latter into and out of engagement with the stationary contacts, each of said contact arms extending through an individual transverse aperture of said tie bar.

9. An electrical protective device as set forth in claim 8 in which those portions of said tie bar defining said apertures encircle each of said contact arms at a point intermediate the ends thereof to provide the sole means connectng the contact arms and the tie bar.

10. An electrical protective device as set forth in claim 1 in which the contactor includes a contact structure and a removable cover which when operatively positioned in front of said contact structure blocks access thereto, said fuse unit when operatively positioned in front of said contactor blocking removal of said cover.

* * * * *